United States Patent
Hung

(10) Patent No.: US 12,515,518 B2
(45) Date of Patent: Jan. 6, 2026

(54) ALL-TERRAIN VEHICLE

(71) Applicant: TAIWAN GOLDEN BEE CO., LTD., Kaohsiung (TW)

(72) Inventor: Mu-Chen Hung, Kaohsiung (TW)

(73) Assignee: TAIWAN GOLDEN BEE CO., LTD., Kaohsiung (TW)

( * ) Notice: Subject to any disclaimer, the term of this patent is extended or adjusted under 35 U.S.C. 154(b) by 538 days.

(21) Appl. No.: 18/077,427

(22) Filed: Dec. 8, 2022

(65) Prior Publication Data

US 2024/0190241 A1  Jun. 13, 2024

(51) Int. Cl.
*B60K 13/02* (2006.01)
*B60K 13/04* (2006.01)
*B60K 15/063* (2006.01)
*B60K 17/04* (2006.01)

(52) U.S. Cl.
CPC .............. *B60K 13/02* (2013.01); *B60K 13/04* (2013.01); *B60K 15/063* (2013.01); *B60K 17/04* (2013.01)

(58) Field of Classification Search
CPC ...... B60K 13/02; B60K 13/04; B60K 15/063; B60K 17/04
See application file for complete search history.

(56) References Cited

U.S. PATENT DOCUMENTS

| | | | |
|---|---|---|---|
| 6,510,912 B1* | 1/2003 | Atsuumi | B62M 27/02 180/69.1 |
| 10,023,039 B2* | 7/2018 | Takaki | B60L 53/67 |
| 10,377,227 B2* | 8/2019 | Kawazoe | B60K 13/04 |
| 10,648,554 B2* | 5/2020 | Kuhl | F16H 57/0489 |
| 11,629,628 B2* | 4/2023 | Itoigawa | F16H 57/027 180/68.3 |
| 2006/0270503 A1* | 11/2006 | Suzuki | F16H 57/0415 474/93 |
| 2016/0332495 A1* | 11/2016 | Franker | B60G 15/065 |

\* cited by examiner

*Primary Examiner* — Bryan A Evans
(74) *Attorney, Agent, or Firm* — MUNCY, GEISSLER, OLDS & LOWE, P.C.

(57) ABSTRACT

An all-terrain vehicle includes a frame unit including a chassis. Disposed on the frame unit are an engine and a transmission assembly connected to the engine. An air filter is connected to the engine. A steering assembly is disposed on the frame unit and distal from the air filter and the transmission assembly. A first air intake pipe is connected to the air filter, and has a first air inlet that is proximate to the steering assembly and that is above the chassis. A second air intake pipe is connected to the transmission assembly, and has a second air inlet that is proximate to the steering assembly and that is above the chassis.

9 Claims, 6 Drawing Sheets

ALL-TERRAIN VEHICLE

FIELD

The disclosure relates to a vehicle, and more particularly to an all-terrain vehicle.

BACKGROUND

An all-terrain vehicle (ATV) or a utility vehicle (UTV) is advertised as being capable of traveling over a variety of terrains such as grass, sand, gravel, and mud, in addition to normal paved roads. Currently, all-terrain vehicles are widely adopted for leisure activities.

Regarding an existing all-terrain vehicle, to shorten an air intake path, an air intake inlet is arranged adjacent to an engine disposed at a rear portion of the existing all-terrain vehicle. In order to be as close to the engine as possible, the air intake inlet is opened closer to a ground surface. Since the existing all-terrain vehicle is used in off-road environments where the existing all-terrain vehicle may encounter foreign materials such as sand particles and water drops while travelling, it is inevitable that some foreign materials might enter the air intake inlet. Although the existing all-terrain vehicle may include an air filter to filter out the foreign materials, frequent replacement of the air filter is troublesome. Furthermore, if the foreign materials enter a power system of the existing all-terrain vehicle, not only will the power performance be adversely effected, but the service life of the power system will also be shortened.

SUMMARY

Therefore, an object of the disclosure is to provide an all-terrain vehicle that can alleviate at least one of the drawbacks of the prior art.

According to the disclosure, an all-terrain vehicle includes a frame unit, a power unit, an air intake unit, and a steering assembly.

The frame unit includes a chassis.

The power unit is disposed on the frame unit, and includes a fuel tank, an engine that is connected to the fuel tank, and a transmission assembly that is connected to the engine.

The air intake unit is mounted to the frame unit and connected to the power unit. The air intake unit includes an air filter that is connected to the engine, a first air intake pipe that is connected to the air filter, and a second air intake pipe that is connected to the transmission assembly.

The steering assembly is disposed at a front portion of the frame unit and is distal from the air filter and the transmission assembly.

The first air intake pipe has a first air inlet that is formed at an end of the first air intake pipe, that is proximate to the steering assembly, and that is above the chassis. The second air intake pipe has a second air inlet that is formed at an end of the second air intake pipe, that is proximate to the steering assembly, and that is above the chassis.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
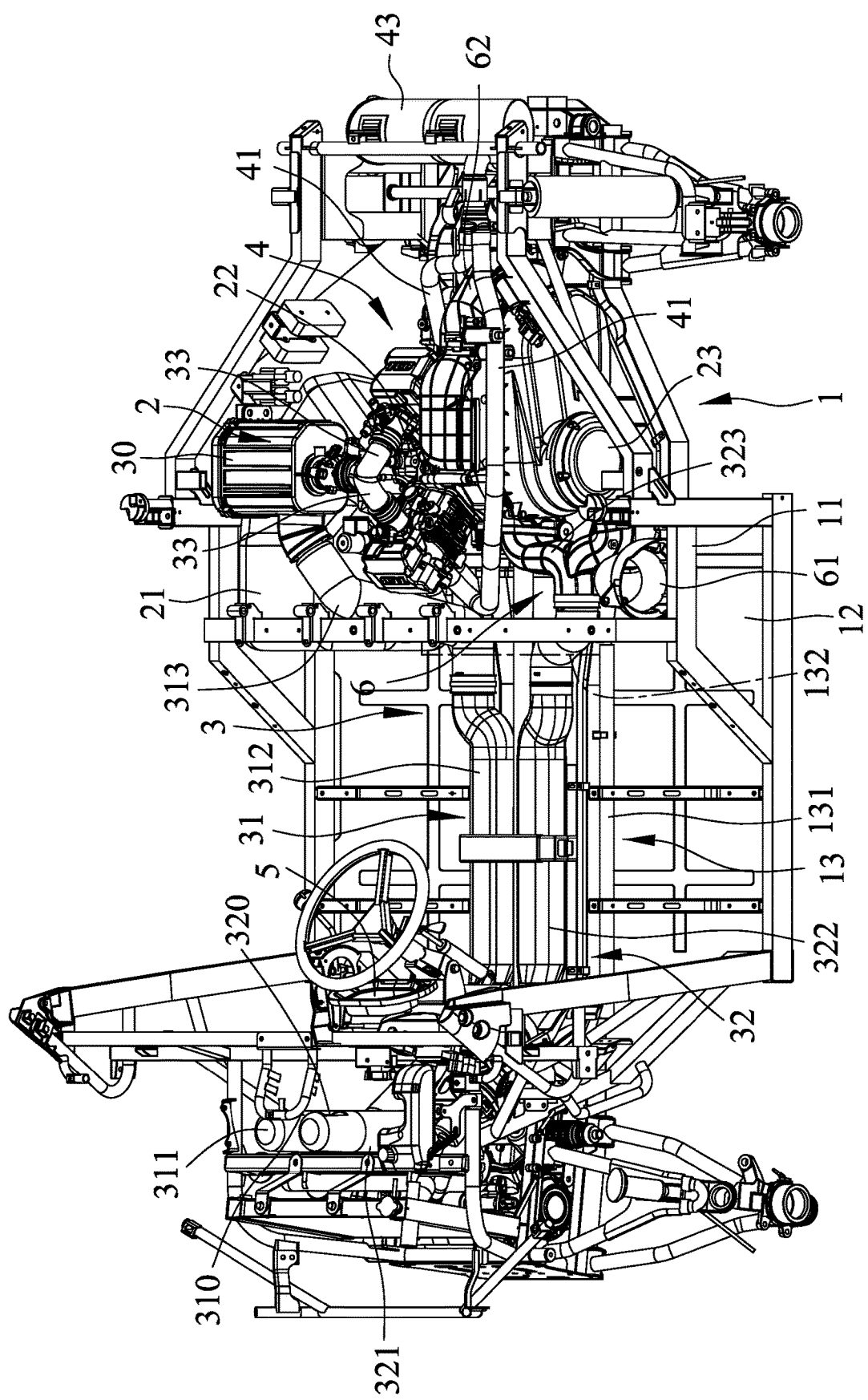
FIG. 1 is a perspective view illustrating an all-terrain vehicle according to an embodiment of the disclosure.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
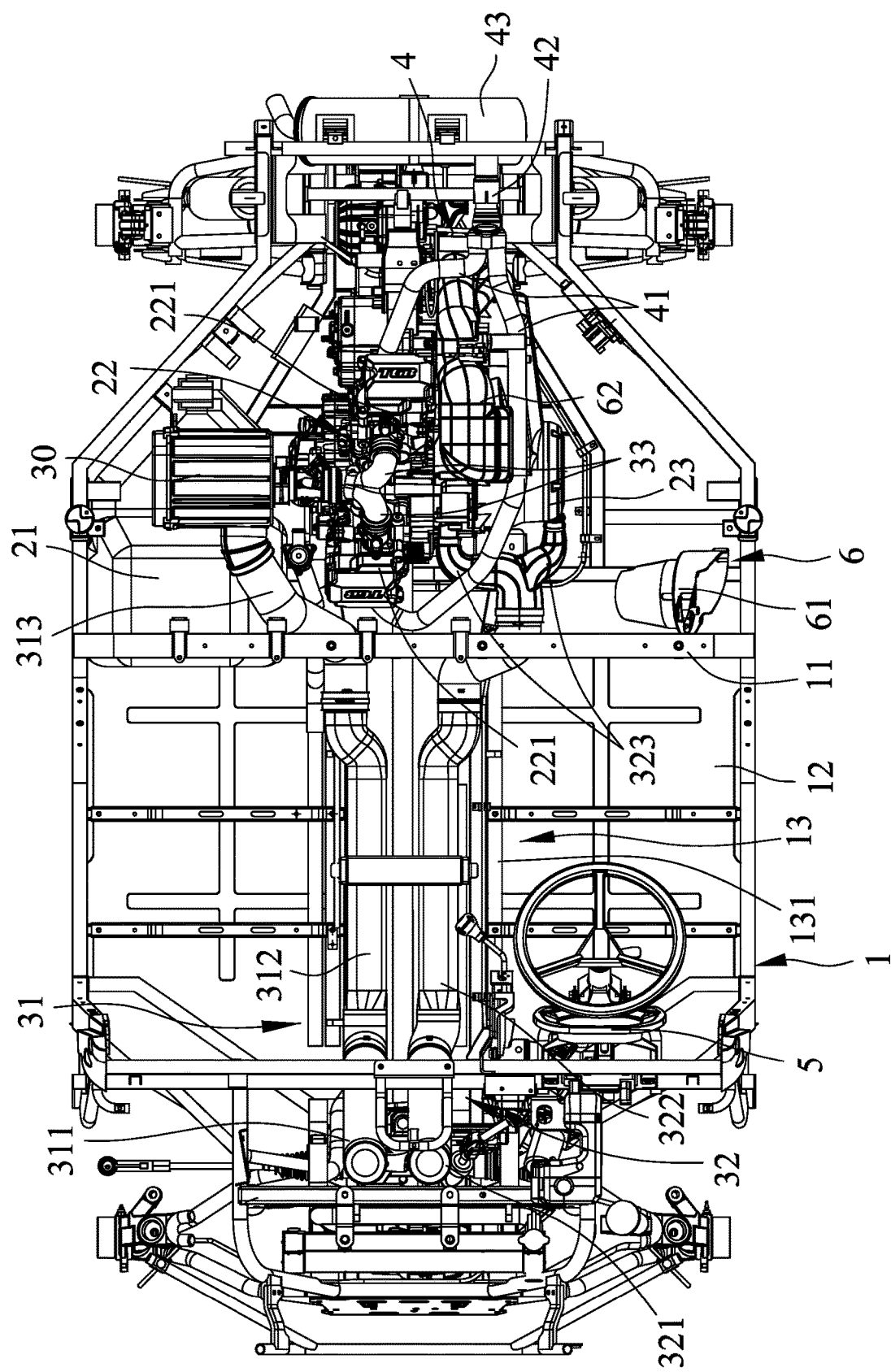
FIG. 2 is a top view of the embodiment.

FIGS. 1 and 2 illustrate an all-terrain vehicle according to an embodiment of the disclosure. The all-terrain vehicle includes a frame unit 1, a power unit 2, an air intake unit 3, an exhaust unit 4, a steering assembly 5, and a cooling unit 6.

Figure 6:
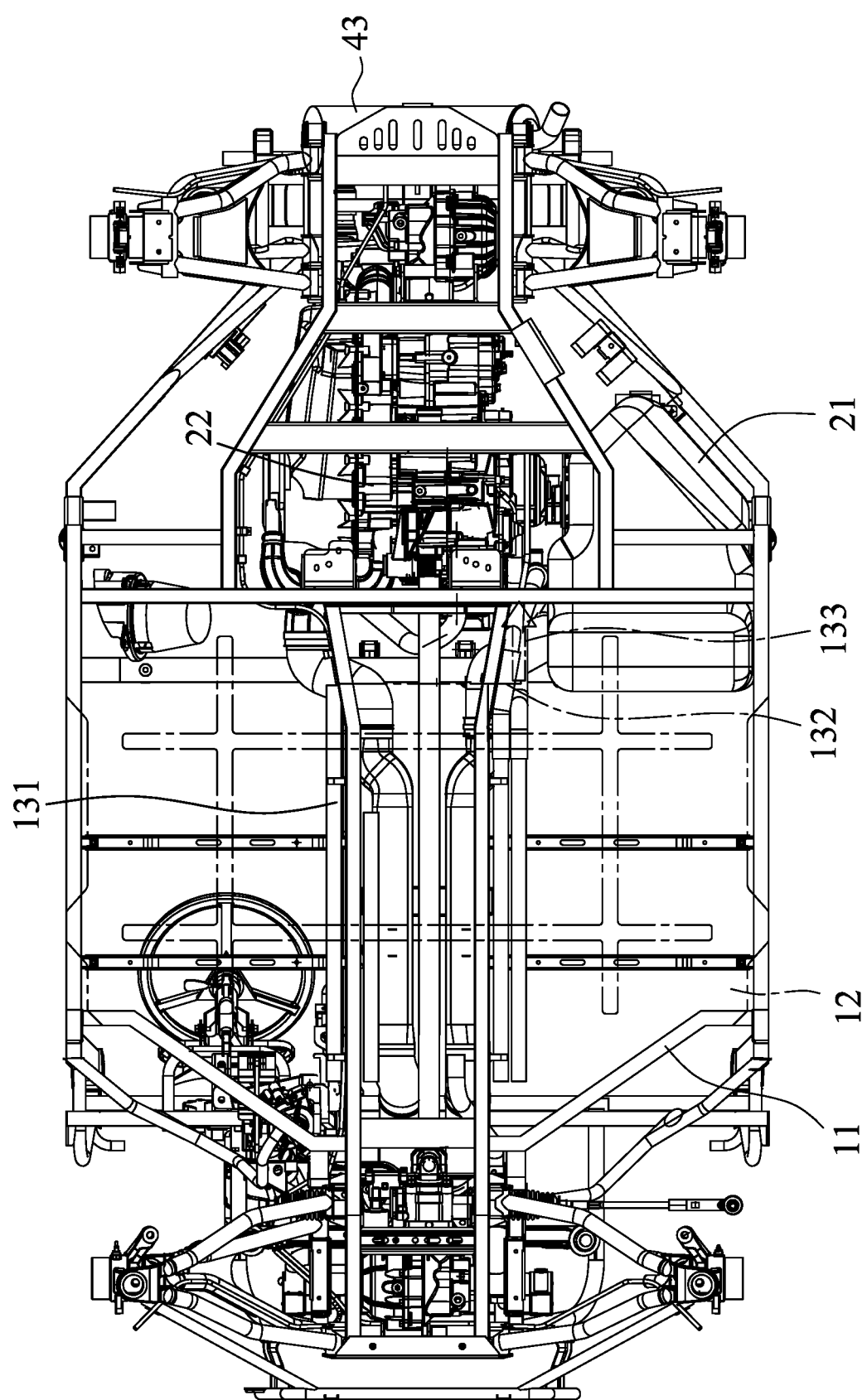
FIG. 6 is a bottom view of the embodiment illustrating a vehicle frame, a chassis and the electrical distribution pipe of the all-terrain vehicle.

The frame unit 1 includes a vehicle frame 11, a chassis 12 that is disposed at a bottom side of the vehicle frame 11, and an electrical distribution pipe 13 that is mounted to the vehicle frame 11. The electrical distribution pipe 13 is to allow a plurality of rearwardly-extending power supply lines (not shown) to power the all-terrain vehicle. As shown in FIG. 6, the electrical distribution pipe 13 has a main segment 131, a bent segment 132, and an arrangement segment 133. The main segment 131 is disposed adjacent to the chassis 12 and extends in a front-rear direction. The bent segment 132 extends obliquely and upwardly from the main segment 131. The arrangement segment 133 extends downwardly from the bent segment 132, has a distal end proximate to the chassis 12, and is adapted for arrangement of the rearwardly-extending power supply lines thereon.

Figure 3:
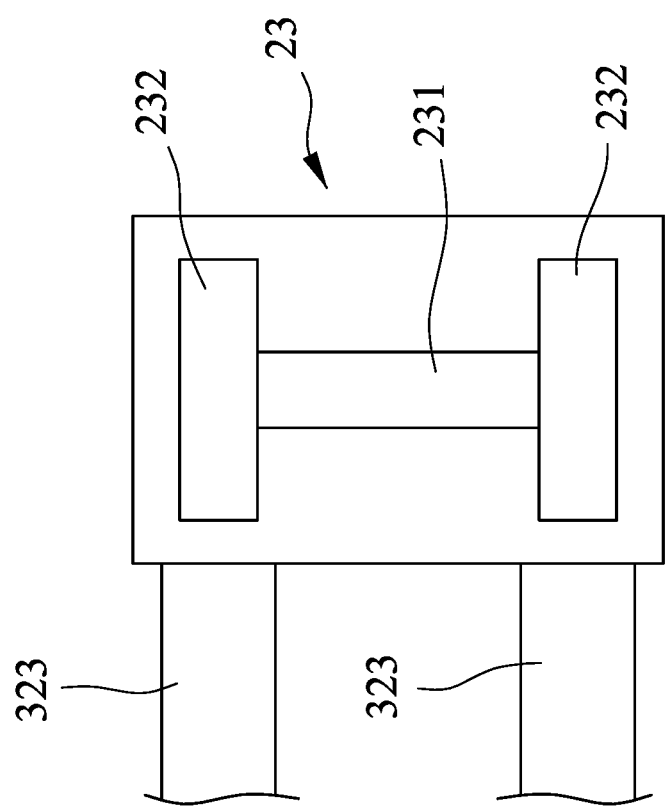
FIG. 3 is a fragmentary enlarged schematic view of the embodiment illustrating a transmission assembly of the all-terrain vehicle.

The power unit 2 is disposed on the frame unit 1, and includes a fuel tank 21, an engine 22 that is connected to the fuel tank 21, and a transmission assembly 23 that is connected to the engine 22. The engine 22 is a two-cylinder combustion engine and includes two cylinders 221 that are spaced apart from each other in the front-rear direction. As shown in FIG. 3, the transmission assembly 23 is a continuously variable transmission, and includes a shaft 231 and two fans 232. The fans 232 are disposed on the shaft 231 and are spaced apart from each other. Rotation of the shaft 231 drives the fans 232 to rotate. Specifically, the fuel tank 21 is juxtaposed to the engine 22, thereby balancing a relatively heavy weight of the engine 22 to optimize the stability of the all-terrain vehicle.

The air intake unit 3 is mounted to the frame unit 1 and connected to the power unit 2. The air intake unit 3 includes an air filter 30 that is connected to the engine 22, a first air intake pipe 31 that is connected to the air filter 30, a second air intake pipe 32 that is connected to the transmission assembly 23, and two input pipes 33. Each of the input pipes 33 communicates between the air filter 30 and a respective one of the cylinders 221. In this embodiment, the first air intake pipe 31 introduces air to the engine 22, and the filter 30 filters the air introduced by the air intake pipe 31, thereby ensuring that the air is clean enough to enter the engine 22 for air-fuel combustion. The second air intake pipe 32 introduces the air to the transmission assembly 23 that generates waste heat in operation, thereby achieving the effect of heat dissipation. Furthermore, as shown in FIGS. 1 and 2, the steering assembly 5 is disposed at a front portion of the frame unit 1 and is distal from the air filter 30 and the transmission assembly 23.

The first air intake pipe 31 has a first longitudinal segment 311, a first extension segment 312, and a first connection segment 313. The first longitudinal segment 311 is disposed forwardly of the steering assembly 5, is upright, and is formed with a first air inlet 310. The first air inlet 310 is formed at an end of the first air intake pipe 31 away from the air filter 30, is proximate to the steering assembly 5, and is above the chassis 12. The first extension segment 312 extends rearwardly from a lower end of the first longitudinal segment 311 opposite to the first air inlet 310. The first connection segment 313 is connected to a rear end of the first extension segment 312, extends upwardly, and is connected to the air filter 30.

The second air intake pipe 32 includes a second longitudinal segment 321, a second extension segment 322, and two second connection segments 323. The second longitudinal segment 321 is disposed forwardly of the steering assembly 5, is upright, and is formed with a second air inlet 320. The second air inlet 320 is formed at an end of the second air intake pipe 32 away from the transmission assembly 23, is proximate to the steering assembly 5, and is above the chassis 12. The second extension segment 322 extends rearwardly from a lower end of the second longitudinal segment 321 opposite to the second air inlet 320. Each of the second connection segments 323 is connected to a rear end of the second extension segment 322 and communicates with the transmission assembly 23. In the front of the power unit 2, the first and second air intake pipes 31, 32 are arranged parallel to each other in a left-right direction. Because the first and second air inlets 310, 320 are proximate to the steering assembly 5 and above the chassis 12 in a manner away from the ground surface for the introduction of air, foreign materials, such as water drops and dust particles, are unlikely to enter the air intake unit 3. In this embodiment, the bent segment 132 of the electrical distribution pipe 13 has a distal end disposed above the first and second air intake pipes 31, 32.

In this embodiment, as shown in FIG. 3, the fans 232 of the transmission assembly 23 are disposed respectively adjacent to the second connection segments 323 of the second air intake pipe 32. During operation of the transmission assembly 23, rotation of the shaft 231 drives the fans 232 to rotate so as to introduce air into the second air intake pipe 32 via the second air inlet 320 so that an amount of air intake is increased.

The exhaust unit 4 is connected to the power unit 2, and includes two output pipes 41, a collecting pipe 42, and a muffler 43. The output pipes 41 respectively communicate with the cylinders 221. The collecting pipe 42 is disposed downstream of and communicates with the output pipes 41. The muffler 43 communicates with the collecting pipe 42. During operation of the engine 22, high-temperature waste gases generated from the cylinders 221 are discharged through the output pipes 41 into the collecting pipe 42 and are exhausted from the muffler 43 so as to achieve cycles of intake, combustion, power, and exhaust.

Figure 4:
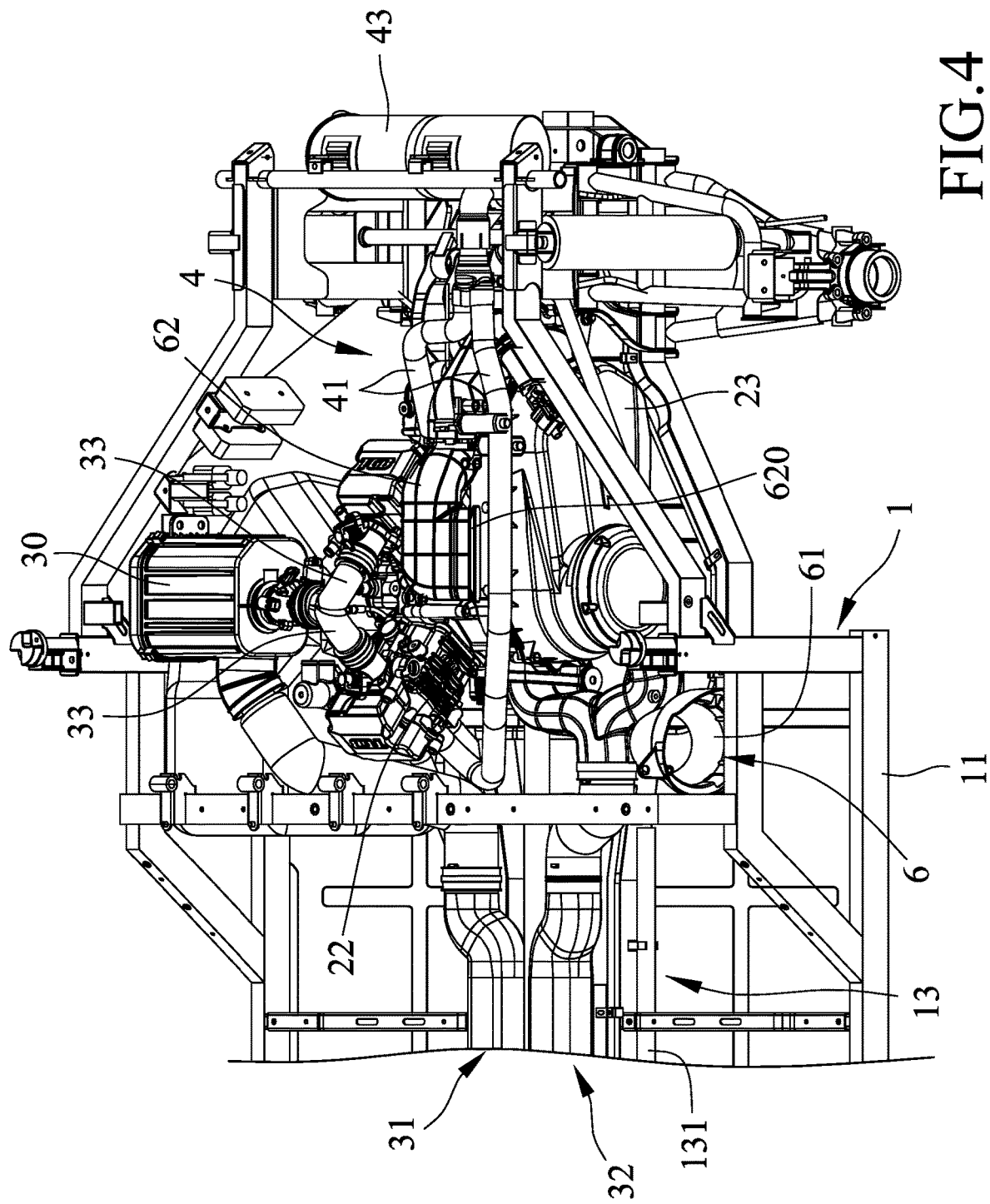
FIG. 4 is a fragmentary view of the embodiment illustrating a frame unit, an exhaust unit, and a cooling unit of the all-terrain vehicle.
Figure 5:
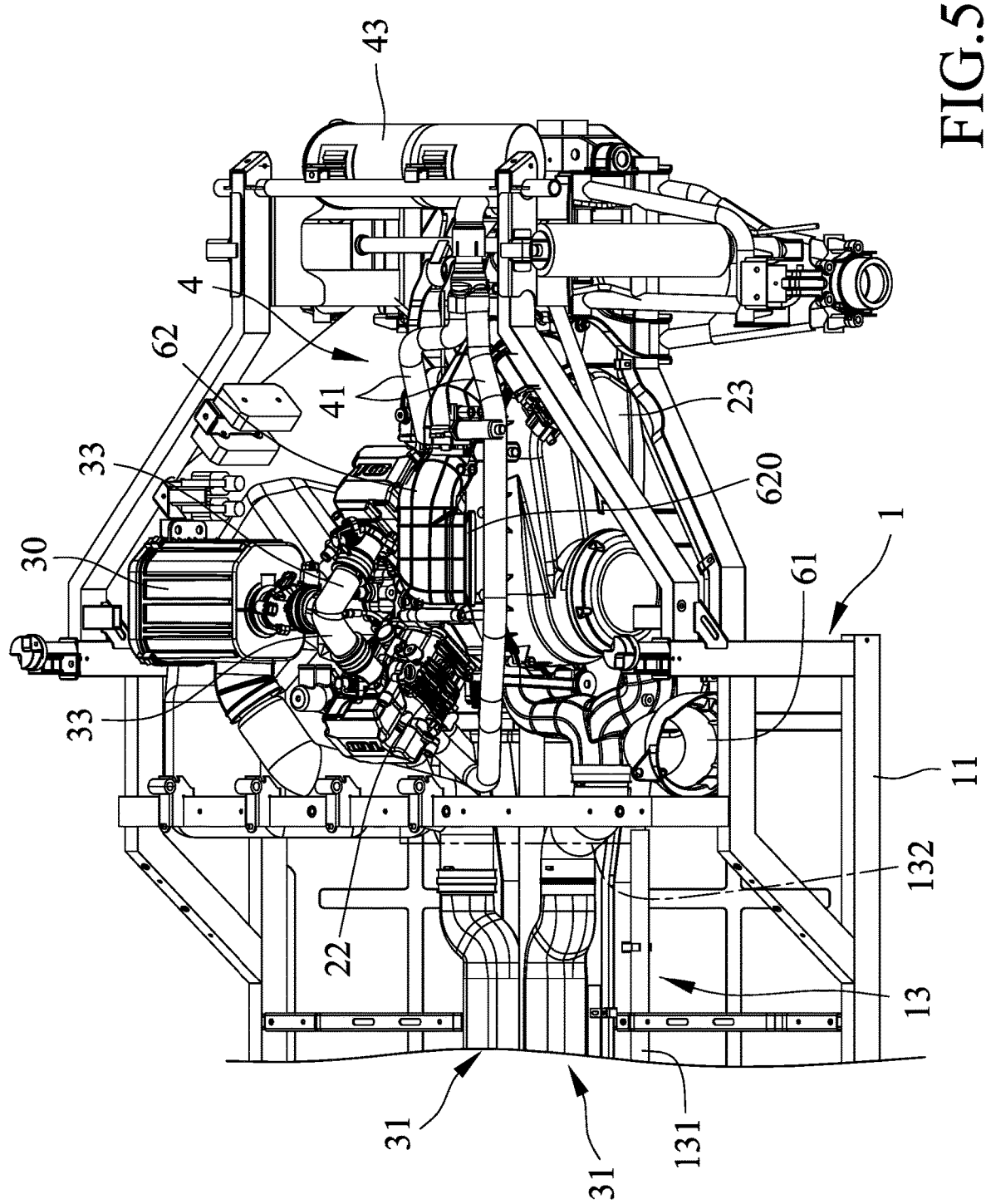
FIG. 5 is a view similar to FIG. 4, but further illustrating an electrical distribution pipe of the all-terrain vehicle.

Referring to FIGS. 4 and 5 in combination with FIG. 2, the cooling unit 6 includes a cooling fan 61 and a cooling hose 62. The cooling fan 61 is mounted to the frame unit 1 and is orientated toward the exhaust unit 4. The cooling hose 62 is connected to the transmission assembly 23 and has an air blowing opening 620 which is open toward one of the output pipes 41. As the output pipes 41 continue to discharge the high-temperature waste gases, not only would the temperatures of the output pipes 41 and adjacent surroundings increase, but operation of adjacent components may also be adversely affected. However, by virtue of the cooling fan 61 directly introducing air into the exhaust unit 4, in addition to one of the output pipes 41 being directly blown and cooled, automatic heat dissipation of a space formed between the power unit 2 and the exhaust unit 4 is also achieved. Because a temperature generated by the transmission assembly 23 is lower than that generated by the engine 22, the air, although passing through the transmission assembly 23, may still deliver heat dissipation to the output pipes 41. Furthermore, the cooling hose 62 discharges the air introduced into the transmission assembly 23 via the second air intake pipe 32 toward one of the output pipes 4, so heat dissipation is additionally optimized by just using the discharged air. Therefore, configured components of the disclosure may be unaffected by the temperature so they may operate regularly.

Referring back to FIGS. 4 to 6, to prevent the power supply lines (not shown) from being affected by high temperature coming from the engine 22 and the exhaust unit 4, the bent segment 132 of the electrical distribution pipe 13 passes upwardly around the first and second air intake pipes 31, 32, extends away from the output pipes 41, and has a distal end disposed above the first and second air intake pipes 31, 32. The arrangement segment 133 of the electrical distribution pipe 13 is arranged along the chassis 12, i.e., arranged at the bottommost portion of an interior space of the all-terrain vehicle of the disclosure. The distal end of the arrangement segment 133 is disposed away from the output pipes 41 of the exhaust unit 4. As a result, the power supply lines are configured to extend rearward and away from the output pipes 41 so as to be connected to electrical parts (not shown) of the all-terrain vehicle. In addition to ensuring that electrical power may be delivered by the power supply lines regularly, since the power supply lines are easily accessible from the chassis 12, maintaining or replacing the power supply lines is relatively simple.

In summary, by virtue of the first and second air inlets 310, 312 being proximate to the steering assembly 5 and above the chassis 12 for introducing air into the engine 22 and the transmission assembly 23 respectively for combustion and heat dissipation, undesired entry of the foreign materials may be reduced. Furthermore, in cooperation with the exhaust unit 4 and the cooling unit 6, the first and second air inlets 310, 312 may effectively facilitate airflow, dissipate heat, and optimize power generation. Therefore, the power generation of the engine 22 can effectively enhanced, and the transmission assembly 23 can be effectively cooled.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An all-terrain vehicle comprising:
    a frame unit including a chassis;
    a power unit disposed on said frame unit, and including
        a fuel tank,
        an engine that is connected to said fuel tank, and
        a transmission assembly that is connected to said engine;
    an air intake unit mounted to said frame unit and connected to said power unit, said air intake unit including
        an air filter that is connected to said engine,
        a first air intake pipe that is connected to said air filter, and
        a second air intake pipe that is connected to said transmission assembly; and
    a steering assembly disposed at a front portion of said frame unit and distal from said air filter and said transmission assembly;
    wherein said first air intake pipe has a first air inlet that is formed at an end of said first air intake pipe, that is proximate to said steering assembly, and that is above said chassis;
    wherein said second air intake pipe has a second air inlet that is formed at an end of said second air intake pipe, that is proximate to said steering assembly, and that is above said chassis;
    wherein said engine includes two cylinders, said air intake unit further including two input pipes, each of said input pipes communicating between said air filter and a respective one of said cylinders;
    wherein said all-terrain vehicle further comprises an exhaust unit connected to said power unit, said exhaust unit including two output pipes that respectively communicate with said cylinders, a collecting pipe that is disposed downstream of and that communicates with said output pipes, and a muffler that communicates with said collecting pipe;
    wherein said frame unit further includes a vehicle frame and an electrical distribution pipe mounted to said vehicle frame, said chassis being disposed at a bottom side of said vehicle frame; and
    wherein said electrical distribution pipe has
        a main segment that is disposed adjacent to said chassis and that extends in a front-rear direction,
        a bent segment that extends obliquely and upwardly from said main segment and that has a distal end disposed above said first and second air intake pipes, and
        an arrangement segment that extends downwardly from said bent segment, that has a distal end proximate to said chassis and away from said output pipes, and that is adapted for arrangement of at least one rearwardly-extending power supply line thereon.

2. The all-terrain vehicle as claimed in claim 1, wherein said first air intake pipe includes:
    a first longitudinal segment that is disposed forwardly of said steering assembly, that is upright, and that is formed with said first air inlet;
    a first extension segment that extends rearwardly from a lower end of said first longitudinal segment opposite to said first air inlet; and
    a first connection segment that is connected to a rear end of said first extension segment, that extends upwardly, and that is connected to said air filter.

3. The all-terrain vehicle as claimed claim 1, wherein said second air intake pipe includes:
    a second longitudinal segment that is disposed forwardly of said steering assembly, that is upright, and that is formed with said second air inlet;
    a second extension segment that extends rearwardly from a lower end of said second longitudinal segment opposite to said second air inlet; and
    at least one second connection segment that is connected to a rear end of said second extension segment and that communicates with said transmission assembly.

4. The all-terrain vehicle as claimed in claim 3, wherein said transmission assembly includes a shaft and at least one fan that is disposed on said shaft and that is adjacent to said at least one second connection segment of said second air intake pipe, rotation of said shaft driving said at least one fan to rotate so as to introduce air into said second air intake pipe via said second air inlet.

5. The all-terrain vehicle as claimed in claim 4, wherein:
    said at least one second connection segments includes two second connection segments; and
    said at least one fan includes two fans that are spaced apart from each other and that are respectively adjacent to said second connection segments.

6. The all-terrain vehicle as claimed in claim 1, further comprising a cooling unit, said cooling unit including a cooling fan that is mounted to said frame unit and that is orientated toward said exhaust unit.

7. The all-terrain vehicle as claimed in claim 6, wherein said cooling unit further includes a cooling hose that is connected to said transmission assembly and that has an air blowing opening which is open toward one of said output pipes.

8. The all-terrain vehicle as claimed in claim 1, wherein said transmission assembly is a continuously variable transmission.

9. The all-terrain vehicle as claimed claim 1, wherein said fuel tank is juxtaposed to said engine.

* * * * *